(12) United States Patent
Miyawaki (10) Patent No.: US 7,703,783 B2
(45) Date of Patent: Apr. 27, 2010

(54) SUSPENSION ARM HAVING A SHAFT PROJECTING THEREFROM AND METHOD FOR PRESS FITTING THE SHAFT INTO A BORE OF ANOTHER MEMBER

(75) Inventor: Naoya Miyawaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/283,991

(22) Filed: Sep. 17, 2008

(65) Prior Publication Data
US 2010/0066050 A1   Mar. 18, 2010

(51) Int. Cl.
*B60G 3/04* (2006.01)
(52) U.S. Cl. ............................. 280/124.134
(58) Field of Classification Search .......... 280/124.134, 280/124.135, 124.136, 124.143, 124.125
See application file for complete search history.

(56) References Cited

U.S. PATENT DOCUMENTS

| 6,905,129 | B2* | 6/2005 | Runte et al. | 280/124.134 |
| 7,293,787 | B2* | 11/2007 | Nunez et al. | 280/124.134 |
| 7,575,244 | B2* | 8/2009 | Howell et al. | 280/124.134 |
| 2002/0000705 | A1* | 1/2002 | Tunzini | 280/124.134 |
| 2003/0034625 | A1* | 2/2003 | Runte et al. | 280/124.134 |
| 2006/0175786 | A1* | 8/2006 | Streubel et al. | 280/124.134 |
| 2008/0084043 | A1* | 4/2008 | Dundon | 280/124.125 |

FOREIGN PATENT DOCUMENTS

JP          9-002035          1/1997

\* cited by examiner

*Primary Examiner*—Faye M. Fleming
(74) *Attorney, Agent, or Firm*—Carrier, Blackman & Associates, PC.; William D. Blackman; Joseph P. Carrier (57) ABSTRACT

A suspension arm includes a shaft having a free end extending from an end of the suspension arm and a base end embedded within the said end of the suspension arm, and this shaft is configured to be press fitted into a tubular member of a compliance bush assembly. An opening is formed in the said end of the suspension arm that allows an anvil (41) to be inserted therein to engage the base end of the shaft so that the force of a press fitting process is prevented from affecting the remaining part of the suspension arm. Thus, the press fitting process can be facilitated because very little effort is required to place the suspension arm ready for a press fitting process, and the fixture for holding the suspension arm during a press fitting process can be simplified.

12 Claims, 8 Drawing Sheets

SUSPENSION ARM HAVING A SHAFT PROJECTING THEREFROM AND METHOD FOR PRESS FITTING THE SHAFT INTO A BORE OF ANOTHER MEMBER

TECHNICAL FIELD

The present invention relates to a suspension arm having a shaft projecting therefrom and a method for press fitting the shaft into a bore of another member such as a tubular member of a compliance bush assembly.

BACKGROUND OF THE INVENTION

A vehicle wheel suspension system is interposed between a vehicle body and a corresponding wheel for the purpose of ensuring a favorable ride quality and a motion stability of the vehicle, and typically comprises a suspension arm pivotally attached to the vehicle body for a vertical swinging movement, a knuckle that rotatably supports a wheel and is pivotally connected to a free end of the suspension arm, a coil spring interposed between the knuckle and a suitable part of the vehicle body, and a shock absorber typically coaxially received in the coil spring and interposed between the knuckle and vehicle body.

The suspension arm is typically given with a highly complex shape, and comprises a shaft or pin projecting from an end of the suspension arm which is press fitted into a tubular member of a compliance bush mounted on a suitable part of the vehicle body. Refer to Japanese patent laid open publication No. 9-002035, for instance.

Conventionally, when press fitting the shaft or pin into a tubular member, the suspension arm is clamped to a support base, and the tubular member is forced onto the shaft or pin. As the suspension arm has a complex shape, there is some difficulty in holding the suspension arm in a stable manner. If the clamping force is excessively increased in an effort to firmly hold the suspension arm, the clamping force could deform the suspension arm. Also, the force of the press fitting may also cause the deformation of the suspension arm depending on the way the suspension arm is held in position.

Such problems could be overcome by suitably designing the clamping arrangement, but increasing the complexity of the clamping arrangement is undesirable because it means in an increase in the cost of the assembling fixture, and a reduction in the work efficiency of the assembling process.

BRIEF SUMMARY OF THE INVENTION

In view of such problems of the prior art, a primary object of the present invention is to provide a suspension arm of a wheel suspension system that can be favorably supported when press fitting a shaft or pin projecting therefrom into a bore of another member.

A second object of the present invention is to provide a suspension arm that does not require a complex support base when press fitting a shaft or pin projecting therefrom into a bore of another member.

According to the present invention, such objects can be accomplished by providing a suspension arm including a shaft having a free end extending from an end of the suspension arm and a base end embedded within the said end of the suspension arm, the shaft being configured to be press fitted into a bore of another member, wherein an opening is formed in the said end of the suspension arm that allows access to a part adjacent to the base end of the shaft.

Because the opening allows the base end of the shaft to be supported, either directly or indirectly, against the force of the press fitting process, the remaining part of the suspension arm is not subjected to the force of the press fitting process. As the suspension arm is not required to be firmly clamped against the force of the press fitting process, the suspension arm is prevented from being deformed by the clamping force remaining part is not required. Also, as the suspension arm can be placed ready for the press fitting process simply by inserting an anvil into the opening, the work efficiency of the press fitting process can be improved as opposed to the case where a complex clamping fixture is used for the press fitting process.

Preferably, the opening allows direct access for an anvil to engage a base end surface of the base end of the shaft. No part of the suspension arm itself is thereby subjected to the force of the press fitting process, and the suspension arm can be supported in a both simple and stable manner.

Typically, the suspension arm comprises an upper plate and a lower plate that are each stamp formed to a prescribed shape and welded to each other to at least partly define a closed cross section, and the shaft is welded to both the upper and lower plates. In such a case, the opening may be formed in at least one of the upper and lower plates.

According to a certain embodiment of the present invention, the opening is formed in each of the upper and lower plates in a mutually registered relationship such that an end surface of the shaft is recessed from corresponding edges of the openings, and the edges of the upper and lower plates may be supported by an anvil inserted into the opening. Because the reaction force of the anvil is applied to the base end of the shaft via a very short sections of the upper and lower plates, most part of the suspension arm is protected from the force of the press fitting process.

According to another embodiment of the present invention, the opening is defined by a recess formed in at least one of the upper and lower plates, and material of the at least one of the upper and lower plates is interposed between the recess and an end surface of the shaft. In this embodiment also, most part of the suspension arm is favorably protected from the force of the press fitting process.

Typically, the other member comprises a tubular member of a compliance bush assembly, and the suspension arm comprises a lower arm of a strut wheel suspension system.

The present invention also provides a method for press fitting the shaft of the suspension arm according to claim 1 into a bore of another member, the method comprising: inserting an anvil projecting from a support base into the opening, and press fitting the shaft into the bore by pushing the other member onto the shaft.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
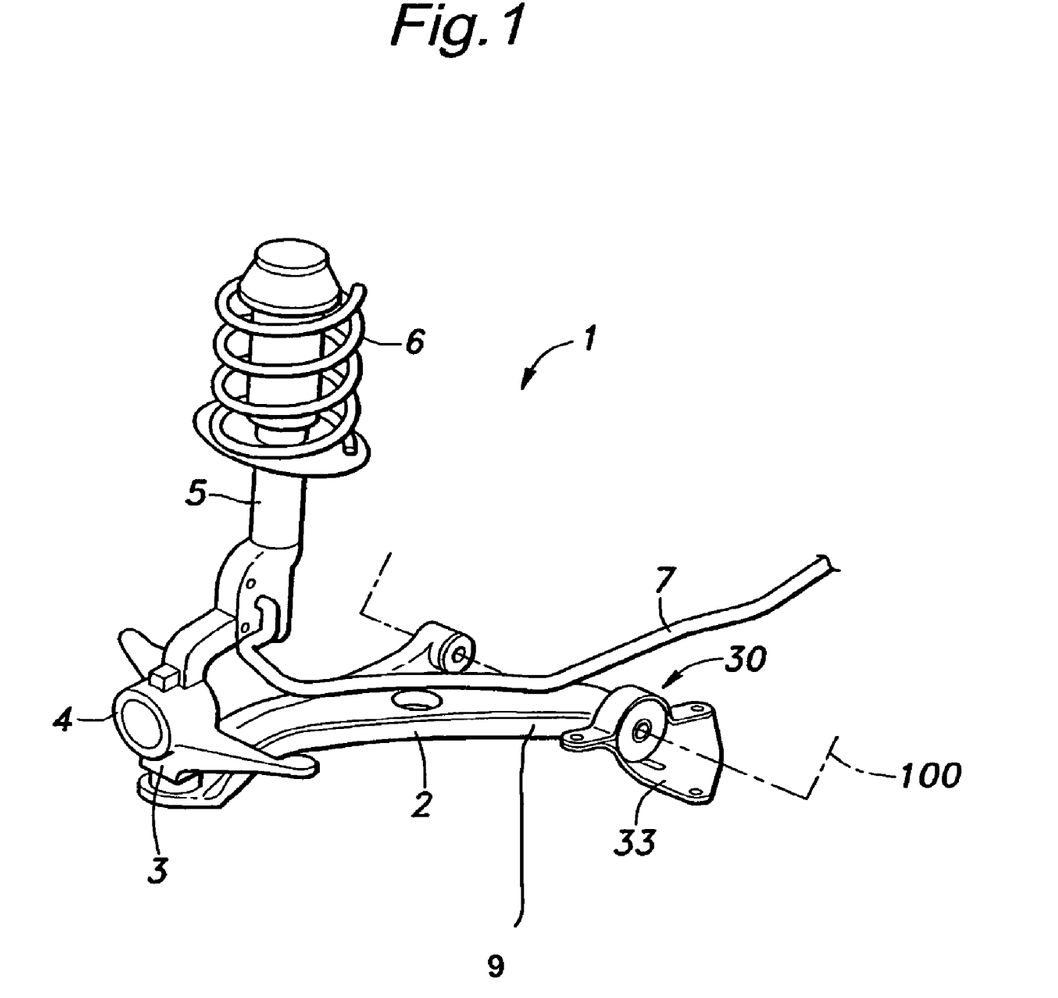
FIG. 1 is a fragmentary perspective view showing a strut type vehicle wheel suspension system for a left front wheel using a suspension arm (lower arm) embodying the present invention.

FIG. 1 shows a strut type vehicle wheel suspension system for a left front wheel using a suspension arm embodying the present invention. This wheel suspension system comprises a lower (suspension) arm 2 having a base end pivotally connected to a vehicle body 100 for a vertical swinging movement, a knuckle 4 pivotally connected to a free end of the lower arm 2 via a ball joint 3, a shock absorber 5 interposed between an upper part of the knuckle 4 and the vehicle body 100, a suspension spring 6 coaxially disposed around the shock absorber 5 and likewise interposed between the knuckle 4 and vehicle body 100, and a stabilizer 7 extending laterally across the vehicle body and having one end connected to the knuckle 4 for the front left wheel and another end connected to the knuckle for the front right wheel not shown in the drawing.

In this wheel suspension system 1, when an impact from the road surface is applied to the wheel, the knuckle 4 pivotally supported by the lower arm 2 moves vertically, and is resiliently supported by the suspension spring 6. The shock absorber 5 controls the undesired oscillatory movement of the vehicle body 100 which is otherwise caused by the suspension spring 6 and associated mass.

Figure 2:
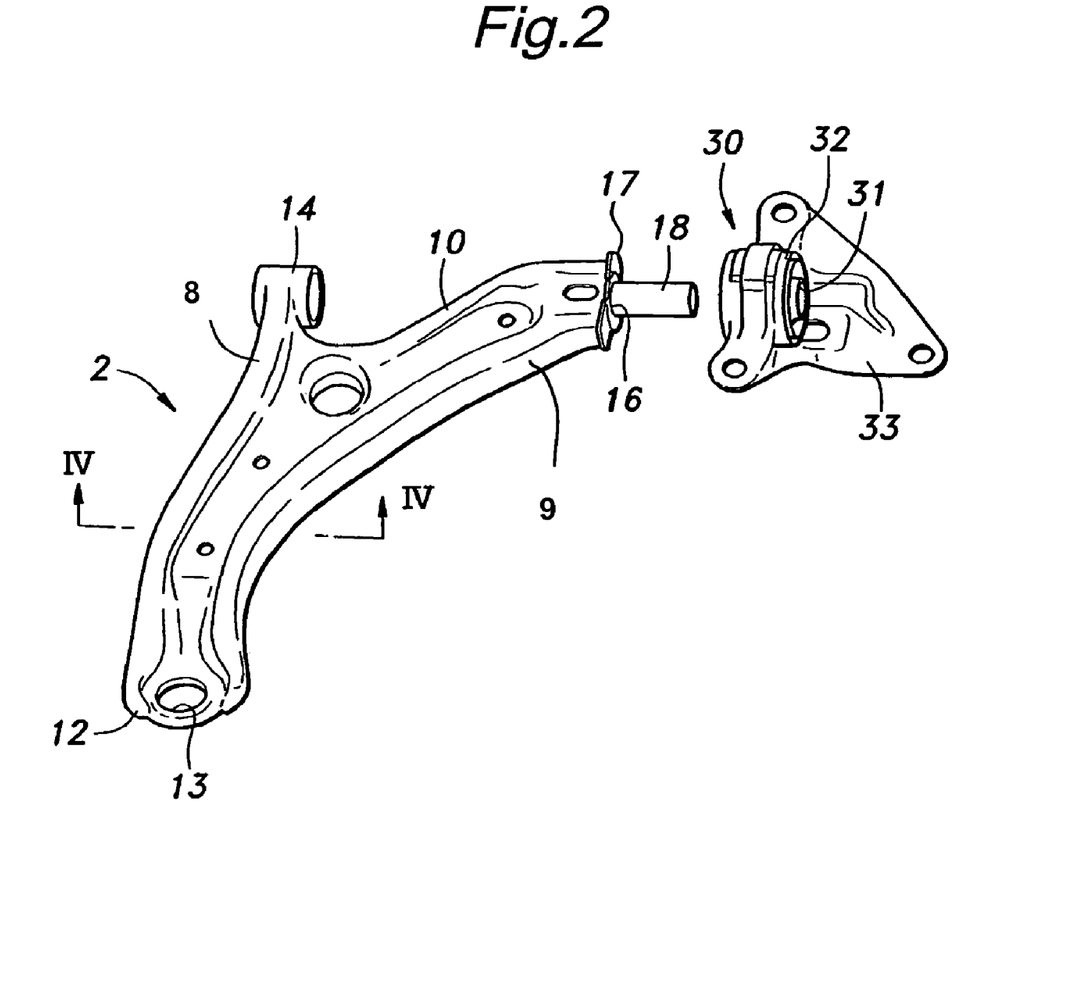
FIG. 2 is an exploded perspective view of the lower arm and an associated compliance bush assembly.
Figure 3:
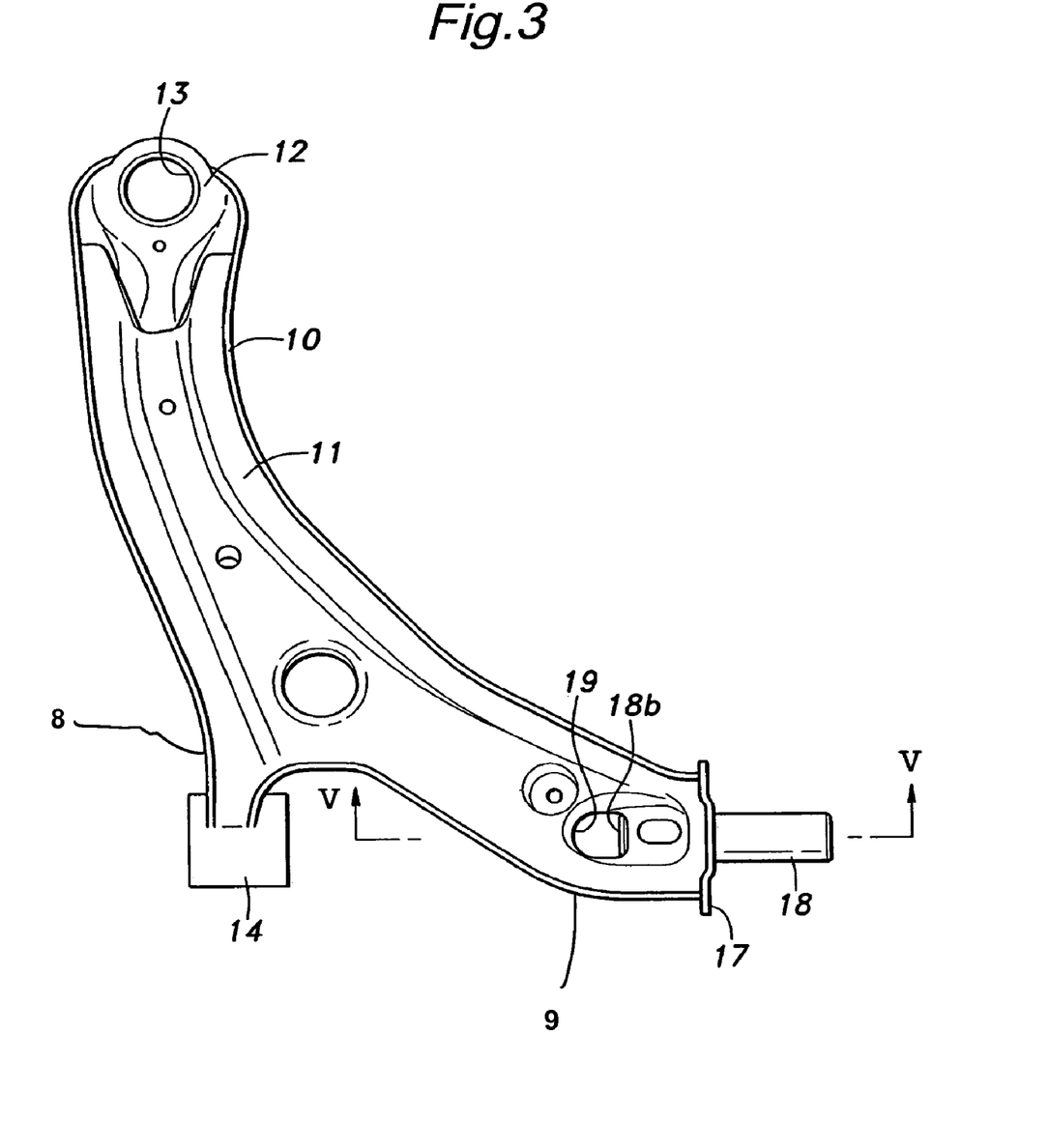
FIG. 3 is a bottom view of the lower arm.
Figure 4:
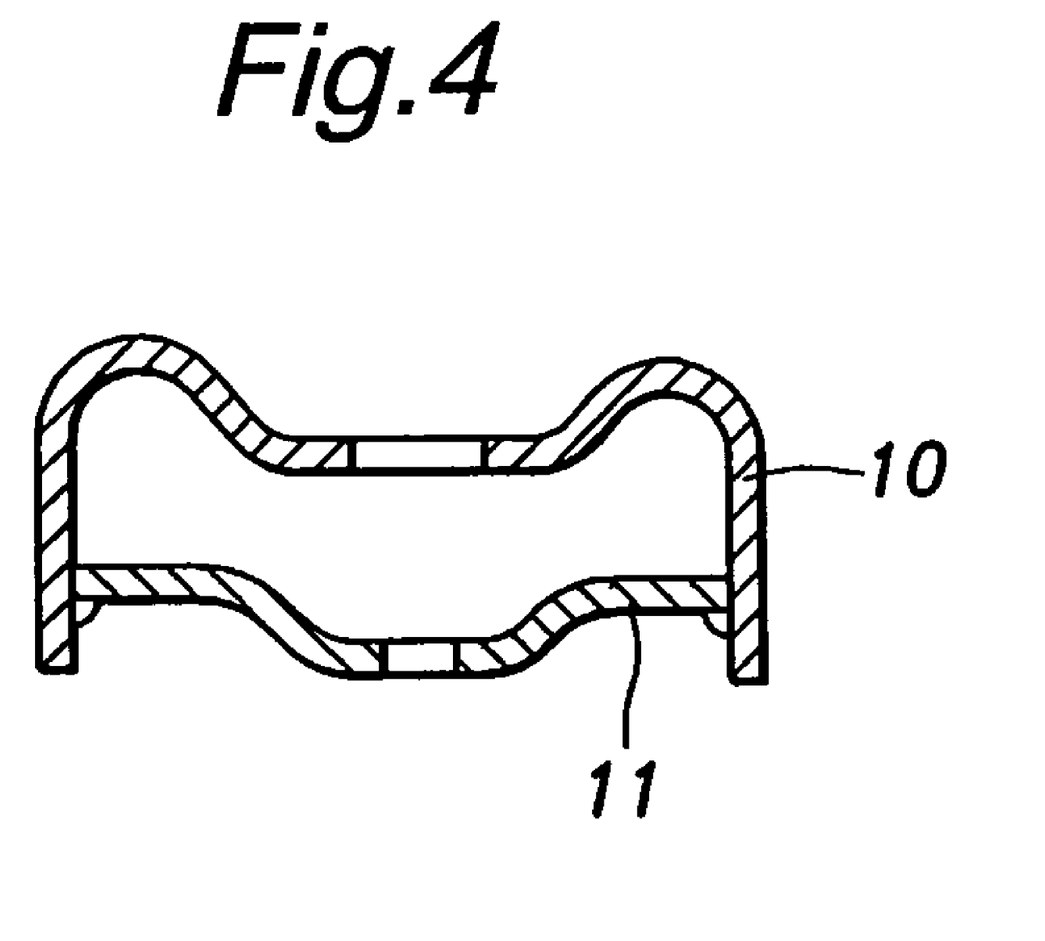
FIG. 4 is a sectional view taken along line IV-IV of FIG. 2.
Figure 5:
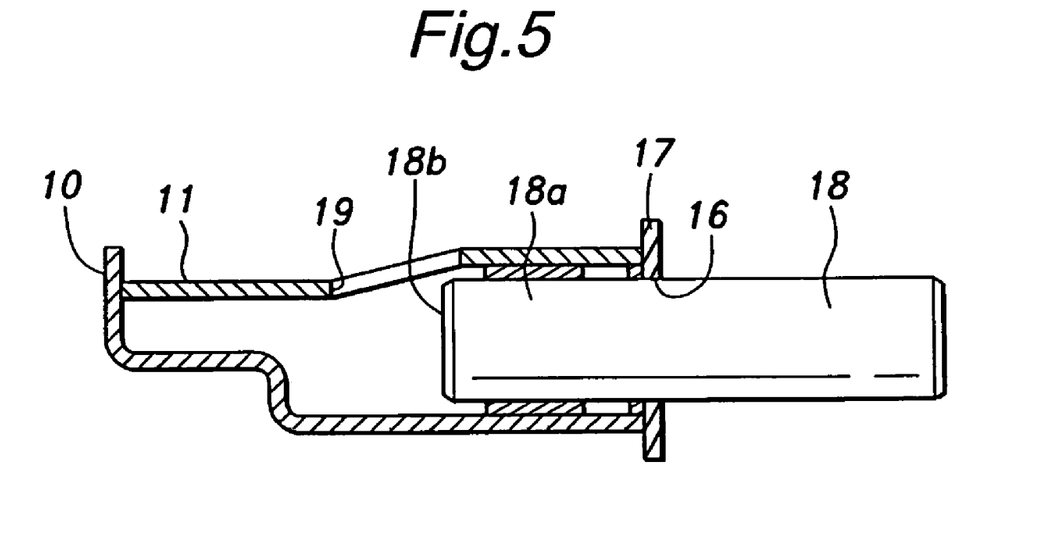
FIG. 5 is a sectional view taken along line V-V of FIG. 3.

FIG. 2 is an exploded perspective view of the lower arm 2 and an associated compliance bush assembly 30. The base end of the lower arm 2 is bifurcated into a front leg 8 and a rear leg 9. The front leg 8 extends substantially linearly and along the lateral direction of the vehicle body 100 from the free end of the lower arm 2 whereas the rear leg 9 extends obliquely toward the inward and rearward of the vehicle body 100. As shown in FIGS. 3 to 5, the lower arm 2 is essentially formed by welding an upper plate 10 and a lower plate 11 to each other, and the upper and lower plates 10 and 11 are each formed by a stamp formed steel sheet so that a closed cross section is defined in most part of the lower arm 2 except for end portions as will be described hereinafter.

The free end 12 of the lower arm 2 is formed solely by the upper plate 10, and is formed with a through hole 13 extending in a vertical direction. The through hole 13 is typically formed by burring, and is configured to receive the ball joint 3.

To the base end of the front leg 8 of the lower arm 2 is welded a collar 14 defining a bore extending in a fore-and-aft direction. The bore of the collar 14 receives a pin (not shown in the drawings) fixed to the vehicle body via a rubber bush.

To the base end of the rear leg 9 of the lower arm 2 is welded an end plate 17 extending perpendicularly to the fore-and-aft direction in such a manner that an opening defined by the upper plate 10 and lower plate 11 is closed by the end plate 17. The end plate 17 is formed with a through hole 16 which is coaxial with the bore of the collar 14. A shaft 18 having a circular cross section is closely passed into the through hole 16, and the base end of the shaft 18 which is received within the space defined between the upper plate 10 and lower plate 11 is welded to the upper plate 10 and lower plate 11. More specifically, the upper plate and lower plate are each provided with a track-shaped opening that exposes a surface of the shaft 18, and the edge of the opening is welded to the shaft 18. Thus, the shaft 18 includes a free end that protrudes from the end plate 17, and a base end received within the lower arm 2.

A part of the lower plate 11 corresponding to the base or inner end of the shaft 18 is provided with a D-shaped opening 19 which exposes the inner or base end of the shaft 18. In particular, the flat edge of the D-shaped opening 19 is substantially aligned with the inner end surface 18b of the shaft 18 or exposes a small length of the inner end of the shaft, and has a certain width and length that provides access to the internal part of the lower arm adjacent to the inner end of the shaft 18. The end surface 18b of the shaft 18 defines a plane perpendicular to the axial direction of the shaft 18.

The compliance bush assembly 30 comprises a centrally located metallic tubular member 30, a rubber member 32 surrounding the tubular member 30 in a fixedly attached manner and a bracket 32 surrounding the rubber member 32 in a fixedly attached manner and configured to be fastened to the vehicle body 100.

Figure 6:
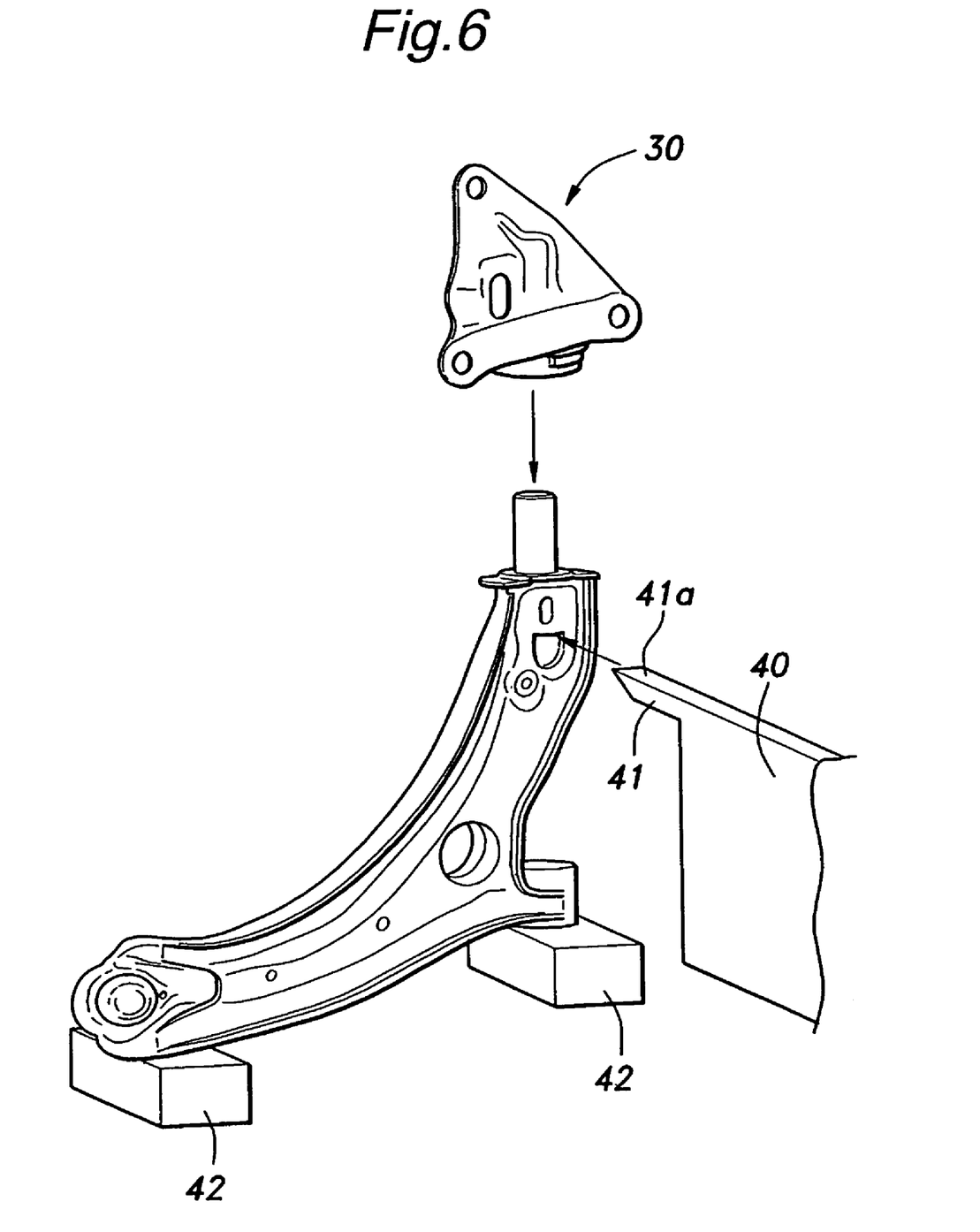
FIG. 6 is a perspective view showing how an anvil is inserted in the opening of the lower arm.

The shaft 18 protruding from the base end of the rear leg 9 of the lower arm 2 is press fitted into the metallic tubular member 31 of the compliance bush assembly 30. FIG. 6 illustrates how the shaft 18 is press fitted into the tubular member 31. The lower arm 2 is turned on its side in preparation for the press fitting operation, as shown, and the arm is supported by a pair of support blocks 42, 42 and by a support base 40 that includes an anvil 41 that extends substantially in the shape of a bird beak, and is provided with a flat upper surface 41a. The anvil 41 is narrow enough to be fitted into the opening 19. When the anvil 41 is introduced into the opening 19, the upper surface 41a of the anvil 41 can engage the end surface 18b of the shaft 18. A remaining part of the support base 40 may lightly engage a suitable part of the lower arm 2 so that the base end surface 18b of the shaft 18 may sit on the upper surface 41a of the anvil 41 in a stable manner.

The tubular member 31 of the compliance bush assembly 30 is then pushed onto the shaft 18 by using a tool designed for such a purpose until the shaft 18 is forced into the tubular member 31 by a prescribed distance. The above components are configured and dimensioned such that the forcing of the tubular member 31 on to the shaft 18 will create an interference fit therebetween. The pressure applied to the tubular member 31 at the time of press fitting is transmitted to the shaft 18, and this pressure is supported by the anvil 41. Accordingly, due to the support provided by the anvil 41 at the time of press fitting, a major portion of the pressure applied to the tubular member 31 is absorbed and distributed by the support member 40, and therefore, this absorbed pressure is not transferred to the remaining part of the lower arm situated below the anvil 41. Therefore, the remaining part of the lower arm 2 is not subjected to any significant force. Therefore, the lower arm 2 is protected from any undue stress that could be otherwise caused by the force of the press fitting process or the clamping pressure for keeping the lower arm 2 stationary against the force of the press fitting process. Also, no sturdy support structure for firmly supporting the lower arm 2 having a highly complex structure is required.

Figure 7:
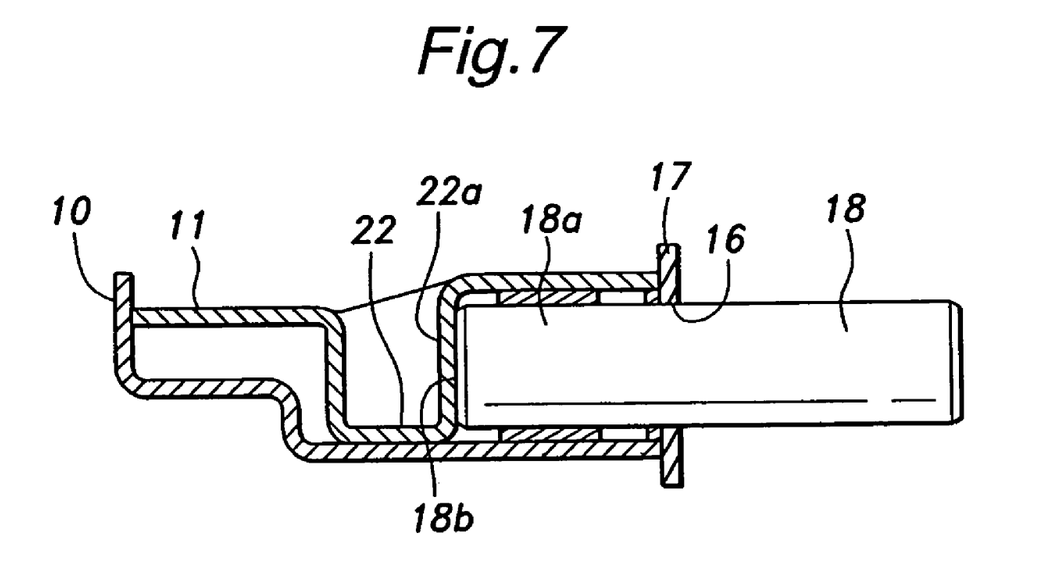
FIG. 7 is a view similar to FIG. 5 showing a second embodiment of the present invention.

FIG. 7 shows a second embodiment of the present invention. As this embodiment differs from the first embodiment only in the arrangement for supporting the lower arm 2 at the time of the press fitting process, the parts of the second embodiment corresponding to those of the first embodiment are denoted with like numerals without repeating the description of such parts.

In this embodiment the opening is defined by a recess 22 formed by stamp forming the lower plate 11 in such a manner that a part of the material 22a of the lower plate 11 is interposed between the recess 22 and the end surface 18a of the shaft 18. In this embodiment also, the force required to support the lower arm 2 against the force of the press fitting process can be essentially directly supported at the base end of the shaft 18 so that the remaining part of the lower arm is free from any stress at the time of the press fitting process.

Figure 8:
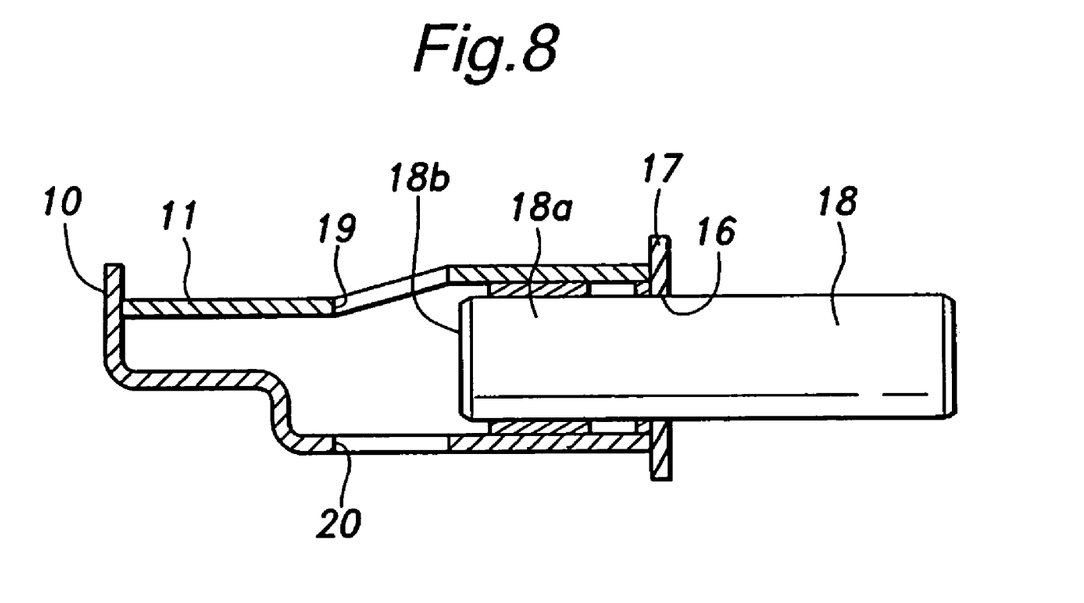
FIG. 8 is a view similar to FIG. 5 showing a third embodiment of the present invention.

FIG. 8 shows a third embodiment of the present invention. As this embodiment differs from the first embodiment only in the arrangement for supporting the lower arm 2 at the time of the press fitting process, the parts of the third embodiment corresponding to those of the first embodiment are denoted with like numerals without repeating the description of such parts.

In this embodiment the opening 19, 20 is formed in each of the lower plate 10 and the upper plate 11 in a mutually registered relationship. The edge of each of these openings 19, 20 adjacent to the base end surface of the shaft 18 is defined by a linear or straight section perpendicular to the axial line of the shaft 18. These linear sections of the openings are slightly offset from the end surface of the shaft 18 so that the anvil 41 is supported by these edges, instead of the end surface of the shaft 18. Because the force required to support the lower arm against the force of the press fitting process is supported by the parts of the upper and lower plates defining the linear sections which are welded to the shaft in the immediate vicinity, the remaining part of the lower arm is free from any stress at the time of the press fitting process, and the advantages similar to those of the first and second embodiments can be obtained.

Although the present invention has been described in terms of preferred embodiments thereof, it is obvious to a person skilled in the art that various alterations and modifications are possible without departing from the scope of the present invention which is set forth in the appended claims.

The contents of the original Japanese patent application on which the Paris Convention priority claim is made for the present application and the contents of any related prior art mentioned in the disclosure are incorporated in this application by reference.

The invention claimed is:

1. A suspension arm including a shaft having a free end extending from an end of the suspension arm and a base end embedded within said end of the suspension arm, the shaft being configured to be press fitted into a bore of another member,
   wherein an opening is formed in the end of the suspension arm such that material forming the suspension arm surrounds the opening on all sides thereof;
   and wherein the opening is configured and arranged to allow access to the base end of the shaft by a portion of a support member during a press fitting assembly operation.

2. The suspension arm according to claim 1, wherein the opening allows access to a base end surface of the base end of the shaft.

3. A suspension arm including a shaft having a free end extending from an end of the suspension arm and a base end embedded within the said end of the suspension arm, the shaft being configured to be press fitted into a bore of another member,
   wherein an opening is formed in said end of the suspension arm, said opening configured and arranged to allow access to the base end of the shaft by a portion of a support member during a press fitting assembly operation, wherein the suspension arm comprises an upper plate and a lower plate that are each stamp formed to a prescribed shape and welded to each other to at least partly define a closed cross section, and the shaft is welded to the upper and lower plates.

4. The suspension arm according to claim 3, wherein the opening is formed in at least one of the upper and lower plates.

5. The suspension arm according to claim 4, wherein the opening exposes an end surface of the shaft so that the end surface may be supported by an anvil inserted into the opening.

6. The suspension arm according to claim 4, wherein the opening is formed in each of the upper and lower plates in a mutually registered relationship such that an end surface of the shaft is recessed from corresponding edges of the openings, and the edges of the upper and lower plates may be supported by an anvil inserted into the opening.

7. The suspension arm according to claim 3, wherein the opening is defined by a recess formed in at least one of the upper and lower plates, and material of said at least one of the upper and lower plates is interposed between the recess and an end surface of the shaft.

8. The suspension arm according to claim 1, wherein the other member comprises a tubular member of a compliance bush assembly, which is configured to be press fitted on to said shaft with force to create an interference fit therebetween.

9. The suspension arm according to claim 1, wherein the suspension arm comprises a lower arm of a strut wheel suspension system.

10. A method for press fitting the shaft of the suspension arm according to claim 1 into a bore of a receiving member, the method comprising:
    stably supporting the suspension arm in a position such that the press fitting may be applied in a downward direction,
    inserting an anvil projecting from a support base into the opening, and
    press fitting the shaft into the bore by pushing the receiving member downwardly onto the shaft, wherein the shaft and the receiving member are configured such that the receiving member is press fitted on to the shaft with force to create an interference fit therebetween.

11. The suspension arm according to claim 1, wherein the opening is substantially D-shaped.

12. A suspension arm including a shaft having a free end extending from an end of the suspension arm and a base end embedded within said end of the suspension arm, the shaft being configured to be press fitted into a bore of another member,
    wherein an opening is formed in said end of the suspension arm that allows access to the base end of the shaft;
    wherein the suspension arm comprises an upper plate and a lower plate, the opening being formed in at least one of the upper and lower plates, and material of said at least one of the upper and lower plates is interposed between the recess and an end surface of the shaft.

* * * * *